US007927213B2

(12) United States Patent  (10) Patent No.: US 7,927,213 B2
Norton et al.  (45) Date of Patent: Apr. 19, 2011

(54) REAL-TIME MARKETING AT GAMING MACHINES

(75) Inventors: David W. Norton, Las Vegas, NV (US); Timothy S. Stanley, Henderson, NV (US); Marc Oppenheimer, Louisville, KY (US); Mary Dorsett, Las Vegas, NV (US)

(73) Assignee: Harrah's Operating Co., Inc., Las Vegas, NV (US)

( * ) Notice: Subject to any disclaimer, the term of this patent is extended or adjusted under 35 U.S.C. 154(b) by 1331 days.

(21) Appl. No.: 11/426,867

(22) Filed: Jun. 27, 2006

(65) Prior Publication Data

US 2007/0015569 A1 Jan. 18, 2007

Related U.S. Application Data

(60) Provisional application No. 60/695,221, filed on Jun. 28, 2005.

(51) Int. Cl.
*A63F 9/24* (2006.01)
*A63F 13/00* (2006.01)
*A06F 17/00* (2006.01)
*A06F 19/00* (2006.01)

(52) U.S. Cl. ............... 463/29; 463/25; 463/20; 463/37; 463/16; 463/42

(58) Field of Classification Search ............... 463/25–27
See application file for complete search history.

(56) References Cited

U.S. PATENT DOCUMENTS

| 5,761,649 | A  | * | 6/1998 | Hill ................................. 705/27 |
| 6,267,671 | B1 | * | 7/2001 | Hogan ............................ 463/25 |
| 6,527,271 | B2 | * | 3/2003 | Soltys et al. .............. 273/148 R |
| 6,672,589 | B1 | * | 1/2004 | Lemke et al. ................. 273/236 |
| 7,008,320 | B2 | * | 3/2006 | Rowe et al. .................... 463/25 |
| 7,022,017 | B1 | * | 4/2006 | Halbritter et al. ............... 463/42 |
| 7,801,736 | B1 | * | 9/2010 | Halbritter et al. ............ 705/346 |
| 2001/0036858 | A1 | * | 11/2001 | McNutt et al. ................. 463/25 |
| 2002/0091991 | A1 | * | 7/2002 | Castro .......................... 717/106 |

(Continued)

FOREIGN PATENT DOCUMENTS

GB 2393841 4/2004

(Continued)

OTHER PUBLICATIONS

Australian Patent Office Search Report and Written Opinion, SG200604409-3, Dec. 20, 2007, 7 pages.

*Primary Examiner* — Paul A. D'Agostino
(74) *Attorney, Agent, or Firm* — Fenwick & West LLP

(57) ABSTRACT

A program for rewarding players for gaming at a casino establishment provides a player with real-time incentives while the player is playing at a gaming machine in the casino. Information about the player and/or the player's gaming activity is collected while the player is at a gaming machine in a casino. This information is used by a marketing system to select an incentive to provide to the player. The incentive is then delivered to the player, for example manually by a casino employee or automatically using a printer or other mechanism at the gaming machine. Various types of incentives can be provided to a player, including incentives designed to provide the player with an experience that is favorable to the casino and incentives designed to keep the player gaming in a casino for a longer amount of time.

38 Claims, 2 Drawing Sheets

U.S. PATENT DOCUMENTS

| | | |
|---|---|---|
| 2002/0128057 A1* | 9/2002 | Walker et al. .................. 463/20 |
| 2002/0177480 A1* | 11/2002 | Rowe .............................. 463/25 |
| 2002/0187834 A1* | 12/2002 | Rowe et al. ..................... 463/42 |
| 2003/0013515 A1 | 1/2003 | Rowe et al. |
| 2003/0050806 A1* | 3/2003 | Friesen et al. .................. 705/5 |
| 2003/0060276 A1* | 3/2003 | Walker et al. .................. 463/25 |
| 2003/0224852 A1* | 12/2003 | Walker et al. .................. 463/20 |
| 2004/0005919 A1* | 1/2004 | Walker et al. .................. 463/23 |
| 2004/0014521 A1* | 1/2004 | Seelig et al. ................... 463/20 |
| 2004/0053681 A1* | 3/2004 | Jordan et al. .................. 463/20 |
| 2004/0103020 A1* | 5/2004 | Giraldin et al. ................ 705/10 |
| 2004/0116115 A1* | 6/2004 | Ertel .......................... 455/426.2 |
| 2004/0142750 A1* | 7/2004 | Glisson et al. .................. 463/42 |
| 2005/0059480 A1* | 3/2005 | Soukup et al. .................. 463/25 |
| 2006/0148551 A1* | 7/2006 | Walker et al. .................. 463/16 |
| 2006/0252524 A1* | 11/2006 | Friesen et al. .................. 463/29 |
| 2007/0004518 A1* | 1/2007 | Friesen et al. .................. 463/42 |
| 2007/0038570 A1* | 2/2007 | Halbritter et al. ............... 705/50 |
| 2007/0105617 A1* | 5/2007 | Walker et al. .................. 463/25 |

FOREIGN PATENT DOCUMENTS

WO    WO 02/83255    10/2002

\* cited by examiner

FIG. 1

Harrahs

Luck Ambassador ✴ VIP Pagers ✴ Local Values ✴ Rest Periods ✴ Rulesets ✴ Parameters ✴ Config ✴ Reports ✴ Help ✴ Logout

*Luck Ambassador*

Last Refreshed: 19:13 [Refresh]    Property: AKC ▼
Next Refresh In: 45 sec [Delay]
Filter: [All Except VIP ▼]  Active: ☐    [Submit]

| Time ▽ | Name | WINet ID | Tier | Location | Rule | Offer | Options |
|---|---|---|---|---|---|---|---|
| 21 | BETTY HALL | 19804999369 | | EE06 | LUC-1A | IQWA | |
| 18 | ROSIE FUENTES | 12100886817 | SEV | MG05 | SEV-1 | XYZZ | |
| 14 | SHERRI PUCCI | 12600136042 | PLT | DB03 | RCT-1E | XYZC | |
| 13 | ERIN HANSEN | 12600156565 | SEV | BH05 | VIP-1 | VIP Alert | |
| 12 | JULIE FRANKLAND | 12600294642 | GLD | AC02 | LUC-2A | XYZD | |
| 1 | EILEEN MOORE | 12600396894 | PLT | DJ01 | RG-1 | RG Alert | |

[Submit]

FIG. 2

| Internal Use Only | Harrahs *Oh Yeah!*     ≡*LUCKY REWARDS* |
|---|---|
| Name _____ | Date of issue _____ |
| Location _____ | Guest Name _____ |
| Amount _____ | Total Rewards card# _____   $ |
| Offer Code _____ | Lucky Reward _____ |
| # Of Trips _____ | Offer Code _____ Employee Name/MGC# _____ |
| | This is not a check. Expires within 30 days of validation. |

FIG. 3

John

You have earned a Reward!

[Print Reward Certificate]  [Decline Reward]

Help

Promos

Harrahs

REAL-TIME MARKETING AT GAMING MACHINES

CROSS REFERENCE TO RELATED APPLICATIONS

This application claims the benefit of U.S. Provisional Application No. 60/695,221, filed Jun. 28, 2005.

BACKGROUND

1. Field of the Invention

This invention relates generally to systems and methods for rewarding players for gaming at casino establishments, and in particular to providing players with real-time incentives while a player is playing at a gaming machine in the casino.

2. Background of the Invention

Commercial enterprises use various methodologies to reward and provide incentives for their customers. Rewarding customers often takes into account the value of the customers to the business. For example, an enterprise may value its customers based on the amount of revenue the enterprise is likely to make from the customer's commercial activity. Identifying customers that generate more revenue for the enterprise allows the enterprise to identify and target those customers for fostering close relationships with them. Enterprises seek to retain these valued customers by keeping them loyal to the enterprise, which is often accomplished through special offers and deals. Many enterprises offer promotions or other programs in which patrons earn value that can be redeemed for goods or services. Such systems are found in many industries, including frequent flyer miles offered by airlines and points offered by many credit card companies.

Complimentaries (commonly referred to as "comps") and other types of incentives are commonly used in casino environments to increase customer traffic and stimulate specific customer behavior. From a casino's perspective, the value of the casino's patrons, or players, is often based on each player's gaming activity. Gaming activity may include, for example, time gambling, average and total bets, coin in, and other measures of gaming volume or rate of play or a value thereof. The casino benefits from the player loyalty that such a comps promotion creates. Casinos typically use various combinations of comps and other incentives that are believed to reward players for their gaming activity most appropriately. One such program gives players rewards players by granting credits (called "points") that can be redeemed for cash or cash equivalents.

Determining which players were the "high rollers" and were worth giving comps and other incentives to used to be essentially ad hoc and entirely up the judgment of the casino manager, without any significant element of technological support. As a result, awarding of incentives was typically limited to players of table games (e.g., blackjack, craps, or baccarat), where the player's betting could be observed by a table or pit boss who "rated" the player based on the boss's estimate of the amount of time the player gambled and their average bet. Later-developed slot tracking programs offered the capability to track player betting in slot machines, and in some cases during table play. These slot tracking programs enabled casinos to determine more precisely how much a particular player had gambled in a particular period of time on one or more slot machines. As a result, casinos became able to offer incentives to slot players, who were also valuable to the casino, not only to the high roller table players.

The incentives offered by casinos include items such as free or discounted rooms, vouchers for meals or shows, and coupons for services and the like. Typically, comps are distributed by mailing the player a voucher as well as by providing vouchers at distribution locations in the casino. Some casinos allow players to use a kiosk located on the casino floor to check their ratings and comp level, print vouchers for comps, and/or redeem vouchers.

But the problem with existing comp systems is that they still require the player to leave the gaming machine in order to obtain a comp. That is, existing comp systems do not provide incentives in real-time, while a player is playing at a gaming machine. Because of this limitation, existing systems cannot provide an incentive to a player to continue gaming, since the player will have left the gaming machine, and possibly the casino, before the incentive can be delivered. Moreover, systems that provide offers and other incentives to players after the players have stopped playing miss out on the opportunity to communicate with the player at the most relevant moment—when the player is gaming at a machine in the casino. Offers and incentives delivered after the player is done playing, received perhaps in the mail long after a player's trip is over, are not as effective as they would be if provided while the player is at a gaming machine. If received after a player has left the casino, an incentive cannot affect behavior of the player at the gaming machine.

Accordingly, what are needed are automated techniques and systems that allow a casino to direct marketing incentives toward a player while the player is at a gaming machine.

SUMMARY OF THE INVENTION

The present invention overcomes the limitations of existing incentives programs by providing for real-time marketing offers and other incentives that can be delivered to a player while the player is playing at a gaming machine. By delivering incentives to players in real time, the incentives can be tailored based on observed events and current information about the player. Because the incentives can be based on current data and delivered before that information becomes stale, more relevant incentives can be provided to a player; thus, they can be specifically designed to encourage the player to continue a gaming session. Moreover, the incentives are provided in a time period in which they are more likely to be effective. This gives a casino the capability to analyze and intervene with its customers' gaming as they play at gaming machines in the casino—and, beneficially, before the customer either ends the gaming session or leaves the casino's property. Marketing to players during their play at a gaming machine allows a casino to dull the sting of losing players so they will return while encouraging winning players to continue playing during the gaming session or to start another gaming session in the near future.

In one embodiment, information about a player and the player's gaming activity is collected while the player is at a gaming machine in a casino. This information is used by a marketing system to select an incentive to provide to the player. The incentive is then delivered to the player, for example manually by a casino employee or automatically using a printer, display system, or other mechanism at the gaming machine. This allows the casino to provide players with more effective incentives to encourage gaming activity and generally improves the players' experience at the casino. Rather than waiting for incentives to arrive in the mail, players can receive and use the incentives while they are still on the casino floor.

One type of incentive is designed to provide the player with an experience that is favorable and thereby to motivate the player to return to the casino. Such incentives may be thought of as "luck" based incentives, as the resulting offer is designed to improve the player's perception of winning at the casino. For example, research shows that new players are not likely to return to a casino if they lose significantly during their first trip. Therefore, if a player loses a predetermined amount (measured, e.g., against a theoretic win rate for a gaming machine) during a gaming session, the player is given an offer during that gaming session. This offer is designed to make the player's overall trip experience more positive in an attempt to ameliorate the negative experience of the gaming loss itself, increasing the likelihood of the player's making a second trip to the casino.

Another type of incentive is designed to keep the player gaming in a casino for a longer amount of time. Such incentives may be thought of as "worth upside" based incentives, as the offer produces an immediate value to the casino in terms of continued playing time. Worth upside incentives are valuable to a casino if the incentive provided to the player costs less than the expected benefit of additional playing time that the incentive causes. To maximize value to the casino, worth upside incentives can target players whose characteristics indicate that an improvement in casino loyalty would result from an incentive. For example, if a customer has been gaming at a slot machine for several hours and dinnertime is nearing, the player may be offered a free meal in the casino. In this way, the player is less likely to leave the casino to eat and thus more likely to continue playing at the casino after dinner.

In other embodiments, the incentive selected for a player is also based on the availability of resources throughout the casino. For example, if there are tickets available for a particular show and the show is about to start, the incentive may be an offer for free tickets to the show. Because these tickets were unlikely to be used anyway, the incentive does not present a significant cost to the casino but has a relatively large upside for the player.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a user interface for managing selection and delivery of incentives to players on a casino floor, in accordance with an embodiment of the invention.

FIG. 2 is a voucher used to deliver an incentive to a player, in accordance with an embodiment of the invention in which incentives are delivered manually.

FIG. 3 is a display on a gaming machine for communicating an incentive to a player, in accordance with an embodiment of the invention in which incentives are delivered electronically.

Figure 4:
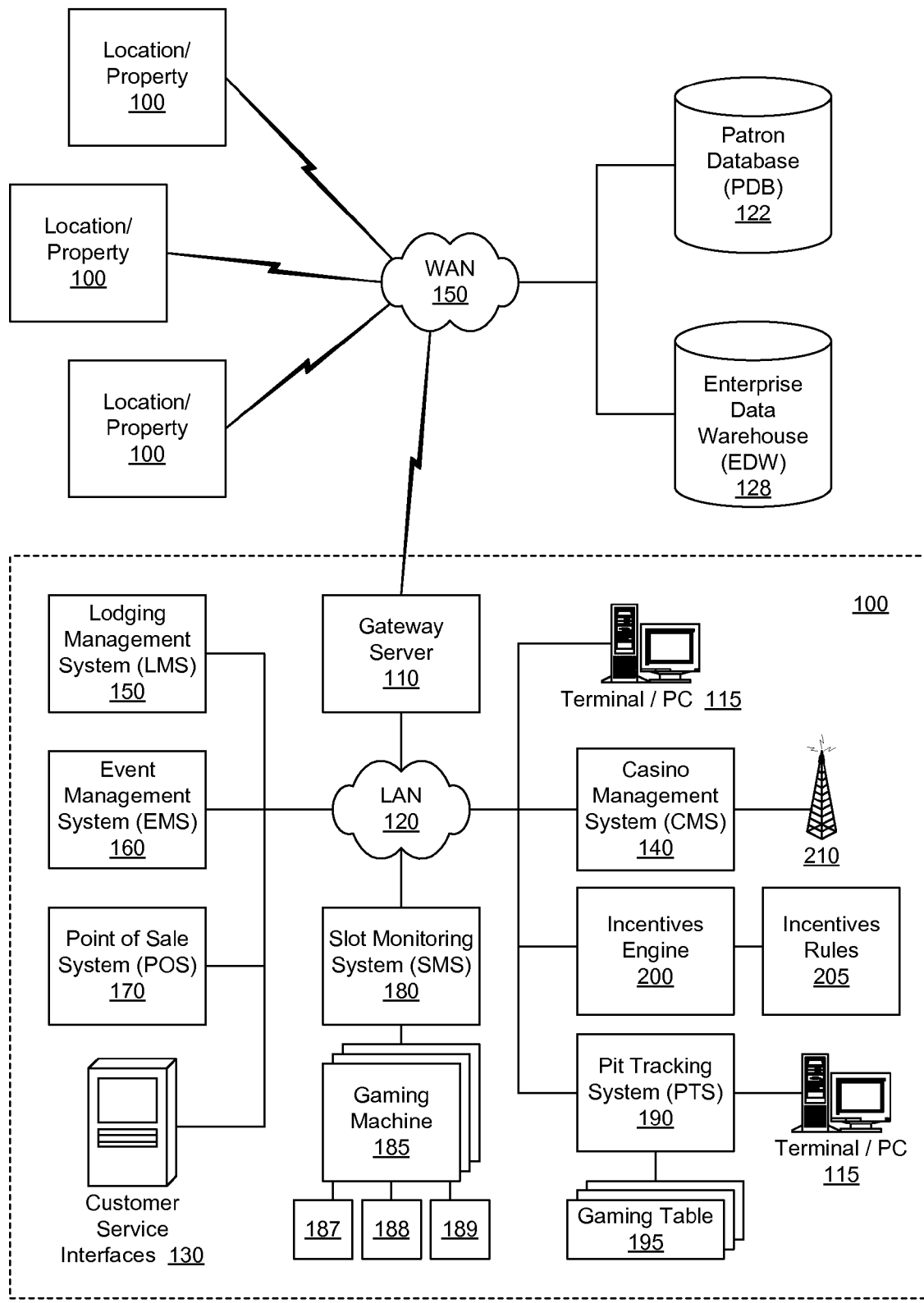
FIG. 4 is a schematic diagram of a system for providing players with incentives in real time, in accordance with an embodiment of the invention.

The figures depict one embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Incentives Overview

Embodiments of the invention allow for real-time marketing directed to players while they are using gaming machines (e.g., slot machines and video gaming machines) in a casino environment. By providing an incentive to a player while the player is still playing at a gaming machine, or at least while the player is still inside the casino, the incentive can be specifically based on the player's current gaming performance and circumstances. This is because the incentive may be provided to the player not only based on static information about the player but also on dynamic information about the player's gaming activity as well as conditions in the casino. In addition, the incentive can be designed for redemption or use in the immediate or near future, which further encourages the player to continue a gaming session or start a new gaming session in the near future. Because of the additional information about casino resources that is available to the casino when selecting incentives and the delivery of incentives to players while still gambling, incentives can be made much more effective. It also enables a great number of marketing possibilities for marketing directed at casino patrons that were not feasible without real-time methods.

Various marketing methodologies can thus be employed to enhance a player's experience while gambling in a casino. In turn, the enhanced experience encourages the player to play for longer and to return to the casino more often. The marketing methodologies enabled by embodiments of the invention enhance the player's experience by providing the player with one or more incentives. An incentive may take any of a number of forms, depending on the marketing program. In one embodiment, the incentive includes one or more of: cash, comps, reward credits, merchandise, meals, lodging, tickets for a show or use of another resource in the casino, or just a friendly personalized greeting. The type of incentive and when to offer it to the player are chosen to advance whatever marketing strategy is desired by the casino.

In one embodiment, the incentives offered to a player as described herein are bonus incentives. With bonus incentives, other player benefits, like comps, reward credit balances, and other offers by mail, are not affected by incentives that are offered to players in real-time at gaming machines. In this way, an incentives program conducted in a casino need not affect other promotions offered at the casino or among a number of locations in a casino enterprise.

In a general methodology in accordance with one embodiment of the invention, incentives are provided to a number of players who are gambling at gaming machines throughout a casino. The incentive provided to a given player is determined based on a set of rules that select an appropriate incentive using information about the player and/or about the player's activity at the gaming machine, and optionally using information about the local casino environment, including available resources. In one embodiment, the information about each player and the player's gaming activity is collected using an automated player tracking system described below. Information about a player may include personal and demographic information about the player, historical gaming activity data for the player, a value ranking or tier level for the player, the player's personal preferences, and other types of static data about the player collected by the casino. A player's gaming activity may include dynamic information about the player's experience at the gaming machine, including gaming machine data such as a theoretical win rate for the machine and the like; a play time threshold, e.g., for the game average and for the player average; a buy in metric, such as coin in average, or coin in customer average; and a performance metric, e.g., actual loss versus machine average or customer average.

Based on the information collected about a player, one or more incentives may be selected for the player based on the collected information about the player and the player's gaming activity. The incentives may also be selected based on the availability of resources located in or controlled by the casino, such as available seats for a show or the utilization of a restaurant. The time of day may be used as a proxy for the availability of resources, for example, assuming that a buffet will be more available during off-peak meal times. By taking into account casino resources when selecting incentives, asset and capacity utilization can be improved. Previous systems in which incentives are not provided in real time to players lack this ability, as when the incentives are delivered—and hence the status of the casino's resources—would generally not be known.

Selecting an incentive for a player involves determining whether the player should be offered an incentive, the type of incentive to offer the player, and when to offer the incentive. Preferably, these tasks are performed in accordance with a set of rules. The rules may be adjusted from time to time by casino marketing staff as desired to alter the marketing directed towards players at gaming machines. This provides the casino with flexibility in testing and implementing a variety of incentives programs.

Once an incentive is selected for a player at a gaming machine, it is delivered to the player, preferably at the gaming machine or at least before the player exits the casino. In one embodiment, delivery of incentives is performed manually by a casino employee. Responsive to the selection of an incentive for a player, a casino employee is notified of the incentive, the player, and the location of the player (e.g., the specific gaming machine that the player is currently using), and dispatched to offer the incentive to the player. In one embodiment, the employee monitors a computer terminal 115 (described in more detail below in connection with FIG. 4) to check for new incentives for players.

Shown in FIG. 1 is an embodiment of a user interface, which may run on the terminal 115 and displays all qualifying players or just the players for which incentive needs to be delivered. An employee may refer to the user interface to identify players throughout the casino and determine the status of any incentives that have been offered or need to be offered to the players. As shown in the example interface of FIG. 1, the employee may refer to the interface to view information for each gaming session, such as the identity of the player 10, a rating or status associated with the player 15, the location or identification of the particular gaming machine 20, the current duration of the session 25, and any offers 30 generated for the player along with the rule 35 that triggered the offer. Beneficially, the user may click on columns to filter and/or sort the entries in the gaming sessions list by the particular attributes that are viewable on the interface. In this way, a casino employee can easily review the list for all players who have qualified for a particular type of incentive. In addition to communicating information to a casino employee to allow the employee to manage the incentives program, the interface may allow the employee to print incentives for delivery.

In one embodiment, when an employee notices a new incentive selected for a player, the employee (or another employee) obtains a physical copy of the incentive in the form of a voucher or other printed or encoded media (e.g., a magnetic stripe card with the incentive encoded as data). The employee then manually delivers the incentive by going to the gaming machine at which the player is playing and offering the incentive to the player. In one embodiment, the employee then uses the user interface to report on whether the offer was delivered successfully. This reporting may be done using the buttons 40 next to each session in the "options" field in the interface. For example, the employee may report that the player was delivered the incentive, that the player was offered the incentive but declined it, that the player was not found, or that the employee decided not to offer the incentive to the player. In this way, the casino can keep track of the incentives program and how many resources are being used by it.

In another embodiment, a casino employee is dispatched to the gaming machine via a paging system. Automated systems for dispatching casino employees to gaming machines are described in U.S. application Ser. No. 09/782,616, filed Feb. 12, 2001, which is incorporated by reference in its entirety. Once at the gaming machine where a player has been playing, the employee checks the player's identification, fills out a voucher for the incentive and gives the voucher to the player. Alternatively, the employee may bring a pre-printed voucher obtained from a central printer station or may print the voucher on demand at the gaming machine using a portable printer.

FIG. 2 shows an example voucher that can be used for this purpose. After the voucher is delivered to a player, the employee may deposit a copy of the voucher information (e.g., from a carbon copy or stub from the voucher) for later auditing purposes and confirm the transaction with a slot dispatch system. Confirming the transaction may be to indicate that the offer was accepted or declined or that the player was not found, and this may be done via the user interface as described above. Confirmation helps the casino to track the success of its incentive system. Manual delivery of incentives in real time provides the player with the feeling of having a very personalized experience.

In an alternative embodiment, the delivery of incentives may also be automated. Automated delivery of incentives may result in a faster, nearly immediate, delivery of incentives to the player, thus increasing the chance of a successful delivery while the player is still playing at the gaming machine. To offer an incentive to a player at a gaming machine electronically, the offer may be communicated to the player via a display system on or near the gaming machine. In one embodiment, shown in FIG. 3, the display is a touch screen color LCD display. A touch screen display allows the player to accept or decline the offer or provide any other information requested by the system. Alternatively or in addition, a physical copy of the incentive may be printed by a printing system at or associated with the gaming machine. A system architecture for performing these functions at individual gaming machines is described in more detail below.

In other embodiments, incentives are delivered to players via a pager, a wireless-enabled PDA, a cell phone, or another wireless device. Portable customized devices may be provided to registered players (such as pagers) or the broadcaster may transmit wireless messages to devices owned by the players (such as cell phones) and registered with the casino. Delivery of offers to a wireless device avoids the problem of not being able to locate a player, for example if the player switches to another gaming machine. It also has the benefits associated with automated delivery of incentives described above.

Accordingly, a number of different types of incentives can be provided to the players at gaming machines in a casino to increase the players' gaming activity at the casino. Offers that provide incentives to players can be designed in various ways. For example, some offers provide the player with a motivation to keep gaming, while other offers provide the player with a favorable experience to motivate the player to return another time.

In one embodiment, the offer is an incentive designed to provide the player with an experience that is favorable to the casino, thus motivating the player to return to the casino. Such an incentives may be thought of as "luck" incentives, as they improve the player's perception of winning at the casino, or at least they lessen the player's perception of having lost money playing at the casino. These types of incentives are not random (at least not completely random), but they are designed to give the experience or impression of luck. Because luck incentives are generated in response to a player's losing money, monetary incentives may be the most effective achieve the goal of the luck incentive. The table below illustrates some example rules for generating luck incentives.

| Rule | Criteria |
| --- | --- |
| Unlucky: 1st Trip | 0 prior Trips AND Today's Loss >= 4x Theoretical Win AND Minimum of $50 loss Today |
| Unlucky: 2nd Trip | 1 prior Trips AND Today's Loss >= 4x Theoretical Win AND Minimum of $50 loss Today |
| Unlucky: 3rd Trip | 2 prior Trips AND Today's Loss >= 4x Theoretical Win AND Minimum of $50 loss Today |
| Unlucky: 4+ Trips (Existing Customer) | 4 or more trips in past 4 months AND Today's loss >= 4x Theoretical Win AND Minimum of $100 Loss Today AND 6 month cumulative Actual > 4X 6 month Theoretical Win AND 6 month cumulative Actual > $1000 |

The rules provided above are just examples of possible rules for luck incentives, and any combination of appropriate criteria can be applied to achieve the goal of a luck incentive.

The first rule here is designed to identify a player who is a new player at the casino, in that they do not have any prior trips to the casino. Research has shown that new players who lose during the first trip to a casino are highly unlikely to return the casino at a later date or time, because they view themselves or the casino as unlucky. Accordingly, the first rule allows the casino to identify these players and then offer than an appropriate incentive to change their perception of themselves and their experience at the casino into a positive one. These and similar rules may be called as 'player loss mitigation rules,' as they are designed to identify players who have likely developed a negative impression of the casino as a result of losing some amount of money during their gaming session or trip(s).

Another class of incentives can be labeled "worth upside" incentives. Worth upside incentives are designed to keep players gaming in a casino for a longer amount of time, thereby providing an immediate value to the casino in. Accordingly, these incentives should be cost less than the expected benefit of additional playing time obtained from the incentive. To maximize value to the casino, worth upside incentives can target players whose characteristics indicate that an improvement in casino loyalty would result from an offer. The table below illustrates some example rules for generating luck incentives.

| Rule | Criteria |
| --- | --- |
| Frequency Upside | Today's Theoretical Win > $100 AND 12 month Average Daily Theoretical Win > $100 |
| Decliners | 3 or more trips in past 4 months AND number of trips in past 1 month is less than 50% of average number of trips in prior 3 months AND 12 month Average Daily Theoretical Win > $100 |
| Reactivated Customer | 12 month Average Daily Theoretical Win > $50 AND 6 month cumulative Actual = 0 AND No rated activity in last six months |

It can be appreciated that these three rules target customers for different worth upside possibilities. The Frequency Upside rule generates an incentive designed to keep a good customer coming back to the casino (as the offer is good for a limited time, such as one week); the Decliners rule targets players who are coming to the casino and gambling less often; and the Reactivated Customer rule rewards a player who had not visited the casino in a long time. In one embodiment, an offer generated by the Frequency Upside rule is valid for one week only, to encourage a player to return to the casino sooner. The rules provided above are just examples of possible rules for worth upside incentives. As new worth upside potential is identified by a casino, rules for new worth upside incentives can be added to target these opportunities.

Using a flexible rules-based system, other types of incentives can be made to advance the business goals of the casino. For example, to facilitate yield management of amenities and services in the casino, the rules may be based at least in part on the availability of resources in the casino. Rules may also be designed to cross-sell gaming machines. For example, if a player is using a gaming machine having a relatively low theoretical win for the casino, the player can be provided an incentive such as free credits to play another gaming machine that has a higher theoretical win. The casino thus wins in the long term by motivating the player to switch to a more profitable gaming machine. Similarly, incentives may be provided for redemption at other property locations, thus encouraging the player to visit another property.

Using personal information about a player, the casino can also recognize and reward a player on his or her birthday, such as with a birthday greeting and a nominal prize. Or, if a player has been playing for a predetermined amount of time, the player can be offered an incentive as a "luck builder," rewarding the long period of play that is profitable fort the casino. In yet another example, incentives may be offered when a player previously gave a poor customer satisfaction score, thereby attempting to make up for a previous bad experience.

As can be seen from the individual rule examples above, each of the rules uses either or both current gaming performance information for the individual player (e.g., today's theoretical win) and historical information (e.g., a twelve-month average theoretical win). Again, the above rules are merely exemplary, and in practice it is expected that many different specific luck-based and worth-based rules can be implemented.

System Architecture

FIG. 4 is a block diagram of an embodiment of a system for practicing embodiments of the incentives methodology at a property 100, which may be a casino or other gaming establishment. In one embodiment in which an enterprise includes a number of properties 100, each property 100 preferably includes a gateway server 110 for coupling a local network 120 (such as a LAN) at the property 100 to a wide area network (WAN) 150. This allows multiple properties 100 to share and exchange data. In addition, the property 100 preferably includes one or more local operator terminals 115 (such as a PC or a dumb terminal) coupled to the LAN 120, allowing the casino personnel to access the system from the property 100. Having an operator terminal 115 at each property 100 allows local casino employees to manage the incentives programs at the property level, in real-time, and in response to player or casino needs.

In one embodiment, the gateway server 110 includes an API for sending data pertaining to local player activity over the WAN 150 to other properties or to a central data warehouse, such as the enterprise data warehouse (EDW) 128 and a patron database 122. The gateway server 110 communicates with several computer systems for monitoring and tracking operations at the particular property 100.

The PDB 122 provides the system with data regarding individual players, or players in a casino context. The PDB 122 preferably includes player accounts for players from all of the supported enterprise properties 100. The PDB 122 can be a centralized database or a distributed or federated database with segments of the database located at various properties 100. In one embodiment, each player account in the PDB 122 includes detailed information such as the player's personal information, preferences, interests, gaming and lodging history, credit rating, comp level, customer value measures, and accumulated credits. A player's customer value is a measure of the player's value to the casino based on the player's betting activity, and optionally based on other activities of the player from which the casino derives revenue or value. In a preferred embodiment, the customer value measure is a theoretical win value is determined according to the player's betting activity accumulated at any of the properties affiliated with the enterprise. Credits may be determined according to player betting activity, but they may also be augmented by other types of activities as well and by special offers and various other promotional programs. These other activities include but are not limited to making a reservation, staying in a hotel, purchasing an item in a retail environment, eating at a restaurant, and attending a show or other events. In another aspect of an embodiment, PDB 122 is coupled via the WAN 150 to the EDW 128 uploading player activity information for further analysis.

In one embodiment, players are issued tracking cards to interface with the system and thereby allow for tracking of their activities and identification of the players at locations in the casino such as gaming machines 185. Each tracking card preferably includes a magnetic strip, microchip, or other mechanism for storing machine-readable data thereon. When a player performs some activity at a property, the player may use the tracking card to interface with the system. For example, in the case of magnetic strip cards, the player inserts the card through into card reader (i.e., "card in"). Specifically for tracking player betting, a slot machine or other gaming machine 185 includes a magnetic stripe card reader (not shown), which is adapted to receive the player tracking cards. The incorporation of card readers into gaming machines 185 is a standard practice and well known to those of skill in the art. In an alternate or additional method of tracking player activity, the player or enterprise personnel can manually enter a player ID number into a terminal 115 coupled to the system.

Depending on the services offered at a property 100, any combination of the following systems might be used to gather player activity data: a Casino Management System (CMS) 140, a Lodging Management System (LMS) 150, an Event Management System (EMS) 160, a Point of Sale System (POS) 170, a Slot Monitoring System (SMS) 180, and a Pit Tracking System (PTS) 190. U.S. Pat. No. 5,761,647, "National Customer Recognition System and Method," the contents of which are fully incorporated by reference herein, explains how a CMS 140, a LMS 150, an EMS 160, a POS 170, a SMS 180, and a PTS 190 are used to track players' gaming and non-gaming activity at a plurality of affiliated casino properties communicatively coupled by a WAN. One suitable system for managing some or all of these point-of-sale operations is the 9700 Hospitality Management System (HMS), offered by MICROS Systems, Inc. The 9700 HMS is specifically designed to handle high usage, multiple revenue center environments, and it enables flexibility in the development of custom point of sale applications.

The CMS 140 is responsible for overall management of the tracking of player activity, and the determination of reward credits to be given to each player based on such activity. The CMS 140 receives data describing a player's activity from the various other systems, as further described below, makes the appropriate calculations for earned reward credits, and updates the player's account in the PDB 122.

The SMS 180 comprises a computer system that monitors and tracks bets made by players at the various gaming machines 185 at the property 100. Gaming machines 185 may include slot machines, video poker machines, or the like. In a preferred embodiment, bet tracking is accomplished through a card reader 189 associated with a gaming machine 185. A player inserts his tracking card in the card reader 189 to initiate bet tracking and removes it to terminate bet tracking. Preferably, a player's betting activity at a gaming machine 185 is logged in real time in the SMS 180 so that the information is provided to the CMS 140 before the gaming session is terminated. Bet tracking data accumulated by the SMS 180 includes the identification of the games played, the amount of coin-in, the number of credits won, the number of credits played, the amount won or lost, and the time period that the player played the game. U.S. Pat. No. 5,429,361, the contents of which are fully incorporated by reference herein, describes a system for tracking the betting activity of casino players at gaming machines. In one embodiment, the SMS 180 comprises the Slot Data System (SDS), a data collection system for slot accounting and player tracking produced by Bally's Gaming and Systems.

In one embodiment, each of the gaming machines 185 includes or is coupled to a display system 187 and/or a printing system 188. The display system 187 communicates general play status information to a player, such as coin-in, money won or lost, and information about reward credits earned. The display may also communicate service messages to the player (e.g., that the player's room or a dinner reservation is ready). This display preferably occurs in real time (e.g., the amount of coin-in counts down and then resets at the end or beginning or a gaming session), although the actual earning and posting of base credits to the player's account occurs on CMS 140 after the player removes his card from the card reader 189. The display 187 is further configured to receive data from the SMS 180, including data about incentives selected for a player at a gaming machine 185. In this way, once an incentive is selected for a player in accordance with the incentives program described herein, the display system 187 can be the means to offer that incentive to a player. In one embodiment, the display 187 is an interactive LCD touch screen display, allowing the player to respond to messages, e.g., to accept or decline an offered incentive.

The printing system 188 is also coupled to the SMS 180 to receive data regarding incentives offered to a player at the corresponding gaming machine 185. In some embodiments of the incentives program described herein, to deliver an incentive to a player at a gaming machine 185, the printing system 188 prints a coupon for the incentive. The player can then redeem the coupon for the incentive in another location in the casino.

In one embodiment, the CMS 140 includes or is coupled to a broadcasting system 210, such as a 802.11 transmitter, that enables a secure, wireless environment. In this way, offers can be delivered to players over a wireless LAN to properly equipped wireless devices held by the players, as described above.

The PTS 190 is used to track player betting at gaming tables 195. Like gaming machines 185. The PTS 190 is supported on a computer system that transmits player betting data to the CMS 140. In one embodiment, the PTS 190 uses card readers 189 associated with players' positions at the gaming tables 195 to track their betting activity. Alternatively, an employee of the enterprise, such as a pit boss, manually enters a player's gaming data into the PTS 190. In one embodiment, data regarding betting activity include a player's time at a gaming table 195 and the table's minimum bet. U.S. Pat. No. 5,613,912, the contents of which are fully incorporated by reference herein, describes a system for automatically tracking the betting activity of casino players at gaming tables. Alternatively, tracking of player betting at gaming tables is provided via a terminal 115 located in the pit near the tables. A player provides her player tracking card to a casino employee (e.g., a pit boss) who swipes the tracking card through a card reader 189 at the terminal 115 to initiate the player's session. The employee can then observe the player's betting, and manually enter this information into the terminal 115, such as average amount bet, length of play, and so forth. U.S. Pat. No. 5,809,482, and U.S. Pat. No. 5,613,912, both incorporated by referenced herein, describes two different embodiment of a PTS 190 that may be used for tracking table play.

The LMS 150 comprises the software and hardware for managing hotel operations within the casino, including reservations, room service, and other activities associated with hotel operations. In a preferred embodiment, the LMS 150 communicates with the CMS 140 to search locally for selected customer information available on that system. However, LMS 150 may include its own local data store for player data specific to the property 100. The LMS 150 transmits data regarding players' lodging activity to the PDB 120 when players check in and out of a hotel. In an embodiment, a player's lodging data includes the dates that the player stayed at a particular property and the type of rooms. This data may also be updated to a central PDB via the application server 102. In addition, the LMS 150 preferably transmits lodging data upon a request from the application server 102 (via the local gateway server 110). The lodging data includes, for example, the dates that a player stays at a hotel, room service activity, and billing information due to the player's stay in the hotel. In one embodiment, the LMS 150 comprises the Lodging Management System, a data management system for hospitality industries produced by Inter-American Data, Inc.

The EMS 160 comprises software for handling ticketing information, reservations, and sales. The EMS 160 compiles player activity data when players purchase tickets for an event (such as a show at the property), make reservations for an event, and attend the event. The EMS 160 transmits this data to the application server 102 upon a request therefrom (via the local gateway server 110).

The POS 170 comprises accounting software for operating restaurants and retail venues within the property as well as software for transmitting charge information to the other management systems. For example, data relating to meals charged to rooms are transmitted from the POS 170 to the LMS 150, and data relating to redeemed meal comps are transmitted from the POS 170 to the CMS 140. The gateway server 110 receives data relating to player's purchases at a property from the POS 170 and transmits the data to the application server 102. This purchasing data includes, in an embodiment, the items or services purchased, the restaurant or retail venue where purchased, and the purchase amounts.

The property 100 preferably includes one or more customer service interfaces (CSI) 130. In one embodiment, a customer service interface 130 comprises a computer having an output display and a user input, such as a card reader 189 and a touch screen. Players can access information for their account with a customer service interface 130, e.g., by swiping their cards through the card reader 189. The customer service interface 130 may be housed in a kiosk or other user accessible housing. In one embodiment, the CSI 130 receives player data by way of their tracking cards swiped at customer service interfaces 130 located at various venues throughout the property 100. The CSI 130 transmits the received data to the PDB 120 to determine the identity of the player and any required data in the player's account (such as name, address, and any preferred customer status). In particular, the CSI 130 enables customers to view the reward credit balance, and to issue themselves redeemable "comp" tickets or cash voucher according to a provided menu of comps and their associated number of credits. In one embodiment, player may be directed to a CSI 130 on the property 100 to collect an incentive offered to the player.

Data related to each player's activity at a property 100, as collected by any of the management systems described herein, are communicated to the CMS 140, for analysis and determination of appropriate reward credits. The CMS 140 updates the PDB 122 with the results of such analyses, including updating a player's account by incrementing (or decrementing) the player's reward credit balance. Because each property 100 tracks player betting activity, awards reward credits and/or other incentives based on such activity, and updates the PDB 122, the enterprise can reward players based on their overall betting (and other activity) at all of the casino properties. This cross-property nature of the system, in combination with the fixed and variable credit rate schedules, enables the enterprise to reward players with incentives based on their overall worth to the enterprise and/or from their overall betting activity, while also allowing individual ones of the properties 100 to reward the player based on property-specific factors or rules. To maintain all account data up to date, the data processed by the local management systems are periodically updated to central PDB 122, e.g., in a batch process. In one embodiment, this update synchronizes data between multiple storage properties (i.e., PDB 122 and local stores associated with the CMS 140 at each property 100) to enable enterprise personnel at any property 100 to access the most recent and accurate data. When this configuration is employed with a WAN 150 having limited bandwidth, the data synchronization is preferably done when traffic on WAN 150 is low to minimize interference with other on-line data access transmissions.

The CMS 140 is responsible for receiving player betting data from the SMS 180 and the PTS 190 and updating the PDB 122 with this information. In one embodiment, the CMS 140 provides each player's gaming activity data to an incentives engine 200, preferably in real time or updated frequently. The incentives engine 200 includes process logic for applying the rules 205 to select incentives based on each player's gaming activity. The incentives engine 200 thus tracks the players' activity in real time and selects incentives for the players based on their gaming activity at the gaming machines 185. Preferably, the incentives engine 200 selects incentives for the players using a set of incentives rules 205, which may include any type of rule as described above. Once an incentive is selected for a player at the gaming machine 185, the incentives engine 200 may communicate the incentive to the gaming machine 185 via the CMS 140 (for automatic delivery), or the incentives engine 200 may communicate the incentive to a casino employee through a terminal 115 in the casino (for manual delivery).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A computer-implemented method for providing real-time incentives to a player at a gaming machine in a casino, the method comprising:
   initiating a gaming session for a player at the gaming machine;
   retrieving, during the gaming session, prior trip information about the player's gaming activity during a prior trip;
   collecting real time information about the player's gaming activity at the gaming machine during the gaming session;
   applying, during the gaming session, the real time information and the prior trip information to a set of rules in order to determine whether the player is expected to leave the casino after the gaming session, wherein the set of rules comprises a second visit rule that determines whether the player has made one prior trip to the casino, compares a loss rate of the player against a multiple, greater than one, of a theoretical win, and compares the loss rate against a daily minimum loss;
   responsive to determining that the player is expected to leave the casino after the gaming session, selecting an incentive for the player designed to incent the player to remain in or return to the casino after the gaming session, the incentive selected at least in part based on the real time information, the prior trip information, and the set of rules; and
   delivering the incentive to the player during or immediately after the gaming session.

2. The method of claim 1, wherein the incentive is selected during the gaming session.

3. The method of claim 1, wherein the incentive is selected immediately after the gaming session.

4. The method of claim 1, wherein the gaming session begins upon an insertion in the gaming machine of a tracking card associated with the player and ends upon withdrawal of the tracking card.

5. The method of claim 1, wherein the set of rules further comprises an unlucky player rule that compares a daily theoretical win against an average daily theoretical win.

6. A computer-implemented method for providing real-time incentives to a player at a gaming machine in a casino, the method comprising:
   initiating a gaming session for a player at the gaming machine;
   collecting real time information about the player's gaming activity at the gaming machine during the gaming session, the real time information comprising a loss rate of the player;
   applying, during the gaming session, the real time information to a set of rules in order to determine whether the player is expected to leave the casino after the gaming session, wherein the set of rules comprises a new player rule that determines whether the player is a new player to the casino, compares the loss rate against a multiple, n one, of a theoretical win, and compares the loss rate against a daily minimum loss;
   responsive to determining that the player is expected to leave the casino after the gaming session, selecting an incentive for the player designed to incent the player to remain in or return to the casino after the gaming session, the incentive selected at least in part based on the real time information and the set of rules;
   delivering the incentive to the player during or immediately after the gaming session.

7. The method of claim 6, wherein the selected incentive offsets a portion of the player's loss at the gaming machine.

8. The method of claim 6, wherein the information about the player's gaming activity includes one or more of: a duration of the gaming session, an amount of money won or lost during the gaming session, and an amount bet during the gaming session.

9. The method of claim 6, wherein the incentive is selected at least in part based on a value of the player.

10. A computer-implemented method for providing real-time incentives to a player at a gaming machine in a casino, the method comprising:
    initiating a gaming session for a player at the gaming machine;
    retrieving, during the gaming session, prior trip information about the player's gaming activity during a prior trip;
    collecting real time information about the player's gaming activity at the gaming machine during the gaming session;
    applying, during the gaming session, the real time information to a set of rules in order to determine whether the player is expected to leave the casino after the gaming session, wherein said set of rules comprises a third visit rule that determines whether the player has made two prior trips to the casino, compares a loss rate of the player against a multiple, greater than one, of a theoretical win, and compares the loss rate against a daily minimum loss;
    responsive to determining that the player is expected to leave the casino after the gaming session, selecting an incentive for the player designed to incent the player to remain in or return to the casino after the gaming session, the incentive selected at least in part based on the real time information and the set of rules, and
    delivering the incentive to the player during or immediately after the gaming session.

11. The method of claim 10, wherein the incentive is delivered manually by a casino employee.

12. The method of claim 10, wherein the incentive is delivered electronically at the gaming machine.

13. The method of claim 10, wherein the incentive is for cash.

14. The method of claim 10, wherein the incentive is for reward credits or complimentaries redeemable by the player for merchandise or services in a casino environment.

15. The method of claim 10, wherein
    the collected information about the player's gaming activity comprises information about the player's loss rate while playing at a gaming machine, the loss rate indicating an amount of money lost by the player using the gaming machine; and the selected incentive is selected responsive to the loss rate exceeding a predetermined amount and is tailored to offset a portion of the amount of money lost by the player.

16. The method of claim 12, wherein the delivering the incentive comprises:

offering the incentive to the player on a display screen associated with the gaming machine;

receiving an input from the player accepting the offered incentive; and printing a voucher for the incentive at a printer associated with the gaming machine.

17. The method of claim 15, wherein the predetermined amount is based on theoretical win rate of gaming machine.

18. The method of claim 15, wherein the predetermined amount is a multiple of a theoretical win rate for the gaming machine.

19. A system for providing real-time incentives to players in a casino environment, the system comprising:

a gaming machine;

a slot management system communicatively coupled to receive prior trip and realtime gaming activity data for a player's gaming session at the gaming machine; and a casino management system communicatively coupled to receive the gaming activity data from the slot management system, the casino management system configured to apply, during the gaming session, the prior trip and real-time gaming activity data to a set of rules in order to determine whether the player is expected to leave the casino after the gaming session, the set of rules comprising an unlucky new player rule that determines whether the player has made less than four prior trips to the casino, compares a loss rate of the player against a multiple, greater than one, of a theoretical win, and compares the loss rate against a daily minimum loss, select, responsive to determining that the player is expected to leave the casino after the gaming session, an incentive for the player designed to incent the player to remain in or return to the casino after the gaming session, the incentive selected at least in part based on the gaming activity data and the set of rules.

20. The system of claim 19, wherein the gaming machine is coupled to the casino management system to receive a communication of the selected incentive, the gaming machine configured to provide the incentive to the player.

21. The system of claim 19, further comprising:

a service terminal coupled to the casino management system, the service terminal displaying the selected incentive to a casino employee to allow manual delivery of the incentive.

22. The system of claim 19, wherein the gaming session begins upon an insertion in the gaming machine of a tracking card associated with the player and ends upon withdrawal of the tracking card.

23. The system of claim 19, wherein the incentive is selected during the gaming session.

24. The system of claim 19, wherein the incentive is delivered to the player during the gaming session.

25. The system of claim 19, wherein the incentive is selected responsive to the player's loss rate at the gaming machine exceeding a predetermined amount.

26. The system of claim 19, wherein the incentive is selected based on a set of rules indicating whether providing the incentive to the player would result in additional worth to the casino.

27. The system of claim 19, wherein the gaming activity data includes one or more of: a duration of the gaming session, an amount of money won or lost during the gaming session, and an amount bet during the gaming session.

28. The system of claim 19, wherein the incentive is selected at least in part based on a value of the player.

29. The system of claim 19, wherein the incentive is selected at least in part based on availability of resources in a casino establishment, where the incentive utilizes resources in the casino environment.

30. The system of claim 19, wherein the incentive is for cash.

31. The system of claim 19, wherein the incentive is for reward credits or complimentaries redeemable by the player for merchandise or services in a casino environment.

32. The system of claim 20, wherein the gaming machine includes a printer for printing a voucher for the incentive.

33. The system of claim 25, wherein the selected incentive offsets a portion of the player's loss at the gaming machine.

34. The system of claim 25, wherein the predetermined amount is based on a theoretical win rate of the gaming machine.

35. The system of claim 25, wherein the predetermined amount is a multiple of a theoretical win rate of the gaming machine.

36. A computer-implemented method for providing real-time incentives to a player at a gaming machine in a casino, the method comprising:

initiating a gaming session for a player at the gaming machine;

retrieving, during the gaming session, prior trip information about the player's gaming activity during a prior trip;

collecting real time information about the player's gaming activity at the gaming machine during the gaming session;

applying, during the gaming session, the real time information and the prior trip information to a set of rules in order to determine whether the player is expected to leave the casino after the gaming session, wherein the set of rules comprises a frequency upside rule that compares a current daily theoretical win of the player against an average daily theoretical win of the player, and compares a twelve month daily theoretical win of the player against and a twelve month average daily theoretical win of the player;

responsive to determining that the player is expected to leave the casino after the gaming session, selecting an incentive for the player designed to incent the player to remain in or return to the casino after the gaming session, the incentive selected at least in part based on the real time information, the prior trip information, and the set of rules; and delivering the incentive to the player during or immediately after the gaming session.

37. A computer-implemented method for providing real-time incentives to a player at a gaming machine in a casino, the method comprising:

initiating a gaming session for a player at the gaming machine;

retrieving, during the gaming session, prior trip information about the player's gaming activity during a prior trip to the casino;

collecting real time information about the player's gaming activity at the gaming machine during the gaming session;

applying, during the gaming session, the real time information and the prior trip information to a set of rules in order to determine whether the player is expected to leave the casino after the gaming session, wherein the set of rules comprises a decliners rule that compares a number of trips to a casino by the player within a first time period against an average number of trips to a casino by the player within the first time period, compares a number of trips to a casino by the player within a second time period against a minimum number of trips to the casino in the second time period, and compares a twelve month daily theoretical win of the player against a twelve month average daily theoretical win of the player;

responsive to determining that the player is expected to leave the casino after the gaming session, selecting an incentive for the player designed to incent the player to remain in or return to the casino after the gaming session, the incentive selected at least in part based on the real time information, the prior trip information, and the set of rules; and delivering the incentive to the player during or immediately after the gaming session.

38. A computer-implemented method for providing real-time incentives to a player at a gaming machine in a casino, the method comprising:

initiating a gaming session for a player at the gaming machine;

retrieving, during the gaming session, prior trip information about the player's gaming activity during a prior trip;

collecting real time information about the player's gaming activity at the gaming machine during the gaming session;

applying, during the gaming session, the real time information and the prior trip information to a set of rules in order to determine whether the player is expected to leave the casino after the gaming session, wherein the set of rules comprises a reactivated customer rule that compares a twelve month daily theoretical win of the player against a twelve month average daily theoretical win of the player, and compares a six month cumulative win of the player against a six month average cumulative win of the player, and requires a predetermined period of inactivity of the player;

responsive to determining that the player is expected to leave the casino after the gaming session, selecting an incentive for the player designed to incent the player to remain in or return to the casino after the gaming session, the incentive selected at least in part based on the real time information, the prior trip information, and the set of rules; and delivering the incentive to the player during or immediately after the gaming session.

* * * * *

UNITED STATES PATENT AND TRADEMARK OFFICE
CERTIFICATE OF CORRECTION

| | |
|---|---|
| PATENT NO. | : 7,927,213 B2 |
| APPLICATION NO. | : 11/426867 |
| DATED | : April 19, 2011 |
| INVENTOR(S) | : David W. Norton et al. |

It is certified that error appears in the above-identified patent and that said Letters Patent is hereby corrected as shown below:

Column 14, lines 6 and 7, after "against a multiple," delete "n one," and insert --greater than one,--.

Signed and Sealed this
Twenty-ninth Day of May, 2012

David J. Kappos
*Director of the United States Patent and Trademark Office*